UNITED STATES PATENT OFFICE.

RUDOLPH GIEBERMANN, OF CHICAGO, ILLINOIS.

SEPARATION OF GLYCERINE FROM FATS.

SPECIFICATION forming part of Letters Patent No. 359,148, dated March 8, 1887.

Application filed August 30, 1884. Serial No. 141,855. (No specimens.)

*To all whom it may concern:*

Be it known that I, RUDOLPH GIEBERMANN, a subject of the German Emperor, residing in Chicago, county of Cook, and State of Illinois, have invented certain new and useful Improvements in Separating Glycerine from Fats, of which the following is a specification.

In efforts to separate glycerine from fats employed in the manufacture of soap-stock a preliminary decomposition has heretofore been effected by subjecting the fat in an admixture of water to the direct action of steam under a pressure of about one hundred and fifty pounds to the square inch and then forcing the admixture thus heated through a confined volume of steam under pressure, after which the glycerine-water settling in the digester is blown off; but this method is objectionable, owing to the length of time necessarily consumed in separating the glycerine from the neutral fats, the liability of the superheated steam to scorch or otherwise cause a discoloration of the soap-stock, the danger attending the employment of steam under excessive pressure, and the necessity of great strength in and corresponding cost of the apparatus it requires.

In some instances alkalies alone, in others oxide of zinc in combination with metallic chlorides, and in others zinc alone partially oxidized, and, finally, zinc and oxide of tin in connection with lime, have heretofore been mixed in with the emulsion of fat and water and then subjected to the action of superheated steam, or else steam under excessive pressure; but in every such instance more or less discoloration of the soap-stock is the result, and, besides, any effort to decompose fat by means of metallic zinc or any of the metallic oxides in connection with superheated steam or steam under excessive pressure results in the evolution of hydrogen gas, which is highly dangerous and otherwise objectionable.

The prime object of my invention is to effect a more complete separation of glycerine from fats than has heretofore been attained, without any liability to discolor or otherwise injure the soap-stock or render the glycerine impure or subject the operator to the dangers involved by the employment of superheated steam, steam under excessive pressure, or the evolution of hydrogen gas.

Further objects are to utilize alkalies and metallic oxides in the separation of glycerine from fats without any liability of discoloring the product, and, finally, to materially reduce the time heretofore required to separate glycerine from fatty acids.

To these ends my invention consists in the employment of any carbonate soluble in alkali and capable of producing an insoluble soap without discoloration, either alone or in connection with any of the metallic oxides or an alkali and steam, as a means for extracting the glycerine from fatty matters admixed with water to form an emulsion contained in a closed retort or digester; but I prefer to use carbonate of zinc or carbonate of tin, or both, because they produce these results to a higher and more satisfactory degree than any of the other carbonates.

In carrying out my invention any suitable known construction of digester or autoclave is employed to contain the fatty substance to be treated. An emulsion of fat in sufficient water is first made, and to this I add either the carbonate of tin or carbonate of zinc, or both, in about the proportion of one-half to one pound, or more, to one thousand pounds of fatty matter. The whole is then subjected for a time to the direct action of steam at a pressure of not more (and may be less) than one hundred and twenty-five pounds, until the fats are effectively decomposed and the glycerine separated therefrom, after which the glycerine and fatty acids can be drawn or blown off in any known or approved way.

Instead of employing solely a carbonate, I may use in connection therewith in the emulsion one or more of the metallic oxides—as, for instance, the oxide of sodium, potassium, barium, magnesium, aluminium, silicum, or aluminate of soda—in the proportion of one-half pound of the carbonate or carbonates to the same weight of the oxide or oxides. In the same proportion I may also use a carbonate in connection with an alkali, or in connection with an alkali mixed with any of the materials set forth in the preceding paragraph, and produce the desired result—namely, an insoluble soap without discoloration—for I have found by satisfactory tests that by the combining of a carbonate having the characteristics described with any of these materials discoloration is effectually prevented, and the resultant soap is substantially insoluble.

Among the advantages resulting from the employment of carbonates is that an excessive pressure of steam and its attendant dangers to life and discoloration of the soap-stock is entirely avoided, or at least reduced in proportion to the differences in effect of steam when at a pressure of one hundred and fifty pounds and a pressure of one hundred and twenty-five pounds, or less, to the square inch. Besides, I have also demonstrated by practice that instead of requiring the usual time of about twelve hours, I am enabled by the employment of carbonates such as I have described to effect decomposition of the fat in about four hours' time, and at the same time effect a more perfect separation of the glycerine from the fats than has heretofore been attained. It may also be stated that the emulsion containing one or more carbonates may be heated in any way without any essential departure from my invention, although the method described is preferred.

Having described my invention, what I claim, and desire to secure by Letters Patent, is—

1. The herein-described method of separating glycerine from fats, the same consisting in subjecting an emulsion of fat and water admixed with a carbonate and without an acid to the action of steam, substantially as described.

2. The herein-described method of separating glycerine from fats, the same consisting in subjecting an emulsion of fat and water and a carbonate of tin or zinc, or both, to the action of steam, substantially as described.

3. The herein-described method of separating glycerine from fats, the same consisting in subjecting an emulsion of fat containing an alkali and carbonate of zinc or tin, or both, to the action of steam, substantially as described.

4. The herein-described method of separating glycerine from fats, the same consisting in subjecting an emulsion of fat containing an alkali and carbonate and one or more metallic oxides to the action of steam in a closed vessel, substantially as described.

RUDOLPH GIEBERMANN.

Witnesses:
W. W. ELLIOTT,
JNO. G. ELLIOTT.